(12) United States Patent
Schmidt (10) Patent No.: US 10,481,754 B2
(45) Date of Patent: *Nov. 19, 2019

(54) SYSTEMS AND METHODS FOR MANIPULATING A 3D OBJECT IN A 3D MODEL USING A SOFTWARE WIDGET AND SURFACE CONSTRAINTS

(71) Applicant: AUTODESK, INC., San Rafael, CA (US)

(72) Inventor: Ryan Michael Schmidt, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/457,915

(22) Filed: Mar. 13, 2017

(65) Prior Publication Data
US 2017/0185262 A1    Jun. 29, 2017

Related U.S. Application Data

(63) Continuation of application No. 13/406,456, filed on Feb. 27, 2012, now Pat. No. 9,594,487.

(51) Int. Cl.
*G06F 3/0481* (2013.01)
*G06T 19/00* (2011.01)
(Continued)

(52) U.S. Cl.
CPC ........ *G06F 3/04815* (2013.01); *G06F 3/0486* (2013.01); *G06F 3/04845* (2013.01); *G06T 19/003* (2013.01); *G06F 2203/04802* (2013.01)

(58) Field of Classification Search
CPC ............ G06F 3/04815; G06F 3/04845; G06F 2203/04802; G06T 19/003
See application file for complete search history.

(56) References Cited

U.S. PATENT DOCUMENTS 5,019,809 A    5/1991   Chen
5,557,714 A    9/1996   Lines
(Continued)

OTHER PUBLICATIONS

D. Brookshire Conner et al., Three-Dimensional Widgets, Jun. 1992, ACM, I3D '92 Proceedings of the 1992 symposium on Interactive 3D graphics, pp. 183-188, 230, and 231.
(Continued)

*Primary Examiner* — Jeffery A Brier
(74) *Attorney, Agent, or Firm* — Artegis Law Group, LLP (57) ABSTRACT

A system and method are disclosed for manipulating objects within a virtual environment using a software widget. The software widget includes one or more controls for performing surface constrained manipulation operations. A graphical representation of the software widget is superimposed over the object and enables a user to use simple mouse operations to perform the various manipulation operations. The position operation determines an intersection point between the mouse cursor and a surface of a different object and moves the object to the intersection point. The scale operation adjusts the size of the object. The rotate operation adjusts the rotation of the object around a normal vector on the surface of the different object. The twist operation deforms the object along a local z-axis. The orientation operation adjusts the orientation of the object with respect to the normal vector.

23 Claims, 9 Drawing Sheets

(51) Int. Cl.
G06F 3/0484 (2013.01)
G06F 3/0486 (2013.01)

(56) References Cited

U.S. PATENT DOCUMENTS

| | | | |
|---|---|---|---|
| 6,295,069 | B1 | 9/2001 | Shirur |
| 6,577,319 | B1 | 6/2003 | Kashiwagi |
| 2003/0210283 | A1 | 11/2003 | Ishii et al. |
| 2007/0070066 | A1 | 3/2007 | Bakhash |
| 2007/0206030 | A1* | 9/2007 | Lukis .............. G06T 19/20 345/653 |
| 2008/0238916 | A1 | 10/2008 | Ghosh et al. |
| 2008/0259077 | A1 | 10/2008 | Liepa et al. |
| 2009/0079731 | A1 | 3/2009 | Fitzmaurice et al. |
| 2009/0158220 | A1* | 6/2009 | Zalewski .............. G06F 3/0346 715/863 |
| 2010/0045666 | A1 | 2/2010 | Kommann et al. |

OTHER PUBLICATIONS

Non-Final Office Action for U.S. Appl. No. 13/406,456, dated Jun. 9, 2015 8 pages.
Final Office Action for U.S. Appl. No. 13/406,456, dated Feb. 3, 2016, 13 pages.
Non-Final Office Action for U.S. Appl. No. 13/406,456, dated Jul. 12, 2016, 15 pages.

* cited by examiner

SYSTEMS AND METHODS FOR MANIPULATING A 3D OBJECT IN A 3D MODEL USING A SOFTWARE WIDGET AND SURFACE CONSTRAINTS

CROSS-REFERENCE TO RELATED APPLICATIONS

This application is a continuation of the co-pending U.S. patent application titled, "SYSTEMS AND METHODS FOR MANIPULATING A 3D OBJECT IN A 3D MODEL USING A SOFTWARE WIDGET AND SURFACE CONSTRAINTS," filed on Feb. 27, 2012 and having Ser. No. 13/406,456. The subject matter of this related application is hereby incorporated herein by reference.

BACKGROUND

Technical Field

The present disclosure relates generally to computer-aided design (CAD) and, more specifically, to systems and methods for manipulating a three-dimensional (3D) object in a 3D model using a software widget and surface constraints.

Description of the Related Art

Many CAD programs, or any other type programs that allow a user to manipulate a 3D object within a virtual environment, include controls that allow a user to manipulate the 3D object in some type of user defined coordinate space. For example, a user may click on the object with the mouse and drag the object in the coordinate space to change the object's position in a particular viewing plane. In other cases, a user may select an object and manually change various parameters that affect the object's position or orientation within the coordinate space. For example, a user may select an object and then change parameters for the object's x, y, and z coordinates in a text box displayed somewhere in the graphical user interface.

Importantly, many of these controls are difficult to use and/or require the user to combine many commands in order to position and orient objects within the coordinate space. Therefore, what are needed in the art are new techniques for manipulating objects within a virtual environment.

SUMMARY

One example embodiment of the present disclosure sets forth a method for manipulating a three-dimensional (3D) object. The method includes the steps of receiving user input associated with a software widget that includes one or more controls, determining a manipulation operation corresponding to a control specified by the user input, and executing the manipulation operation to adjust the 3D object. The software widget is associated with the 3D object and at least one of the one or more controls comprises an orientation control that, when adjusted, causes a new orientation vector to be determined that is based on the intersection of a ray with a sphere superimposed over the software widget, and changes the orientation of the 3D object to reflect the new orientation vector.

Another example embodiment of the present disclosure sets forth a computer readable storage medium containing a program for manipulating a 3D object, which, when executed, causes a graphical user interface to be displayed that includes the software widget, described above. Yet another example embodiment of the present disclosure sets forth a system for manipulating a 3D object. The system includes a processor and a memory coupled to the processor, the memory including an application configured to perform the method set forth above.

One advantage of the disclosed approach is that the software widget enables the user to manipulate multiple degrees of freedom for manipulating the object using simple controls accessible with a single type of user input (e.g., mouse input). The user can position and orient an object in three dimensions using a single interface and without changing viewing perspectives or control planes. Previously, such operations would be performed using multiple operations controlling one or two degrees of freedom, often constrained to a single plane within the virtual environment.

BRIEF DESCRIPTION OF THE DRAWINGS

So that the manner in which the above recited features can be understood in detail, a more particular description, briefly summarized above, may be had by reference to certain example embodiments, some of which are illustrated in the appended drawings. It is to be noted, however, that the appended drawings illustrate only typical embodiments and are therefore not to be considered limiting the scope of the claims, which may admit to other equally effective embodiments.

For clarity, identical reference numbers have been used, where applicable, to designate identical elements that are common between figures. It is contemplated that features of one example embodiment may be incorporated in other example embodiments without further recitation.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

System Overview

Figure 1:
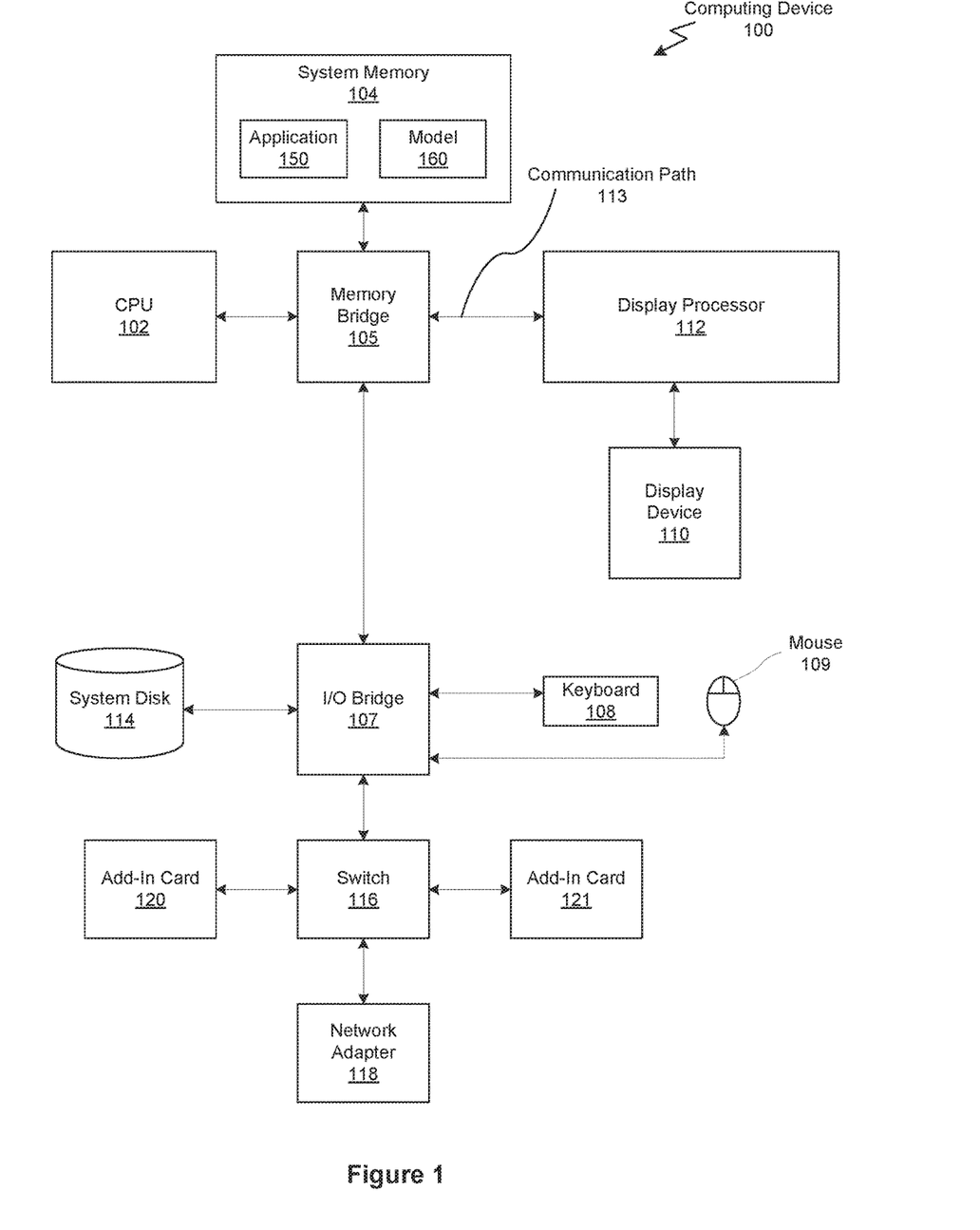
FIG. 1 is a block diagram of a computing device configured to implement one or more aspects of the present disclosure.

FIG. 1 is a block diagram of a computing device 100 configured to implement one or more aspects of the present disclosure. Computing device 100 may be a computer workstation, personal computer, or any other device suitable for practicing one or more embodiments of the present invention. As shown, computing device 100 includes one or more processing units, such as central processing unit (CPU) 102, and a system memory 104 communicating via a bus path that may include a memory bridge 105. CPU 102 includes one or more processing cores, and, in operation, CPU 102 is the master processor of computing device 100, controlling and coordinating operations of other system components. System memory 104 stores software applications and data for execution or processing by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices such as keyboard 108 or mouse 109 and forwards the input to CPU 102 via memory bridge 105. In alternative embodiments, I/O bridge 107 may also be connected to other input devices such as a joystick, digitizer tablets, touch pads, touch screens, still or video cameras, motion sensors, and/or microphones (not shown).

One or more display processors, such as display processor 112, are coupled to memory bridge 105 via a bus or other communication path 113 (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104. Display processor 112 periodically delivers pixels to a display device 110 that may be any conventional CRT or LED monitor. Display processor 112 may be configured to provide display device 110 with either an analog signal or a digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows computing device 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCIe), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

CPU 102 provides display processor 112 with data and/or instructions defining the desired output images, from which display processor 112 generates the pixel data of one or more output images. The data and/or instructions defining the desired output images can be stored in system memory 104 or a graphics memory within display processor 112. In one embodiment, display processor 112 includes 3D rendering capabilities for generating pixel data for output images from instructions and data defining the geometry, lighting, shading, texturing, motion, and/or camera parameters for a scene. Display processor 112 can further include one or more programmable execution units capable of executing shader programs, tone mapping programs, and the like.

In one embodiment, application 150 and model 160 are stored in system memory 104. Application 150 may be a CAD application configured to generate and display graphics data included in model 160 on display device 110. For example, model 160 could define one or more graphics objects that represent a 3D model of a house designed using the CAD system. One example of application 150 is Autodesk® AutoCAD software.

It will be appreciated that the computing device shown herein is illustrative and that variations and modifications are possible. The connection topology, including the number and arrangement of bridges, may be modified as desired. For instance, in some embodiments, system memory 104 may be connected to CPU 102 directly rather than through a bridge, and other devices may communicate with system memory 104 via memory bridge 105 and CPU 102. In other alternative topologies display processor 112 may be connected to I/O bridge 107 or directly to CPU 102, rather than to memory bridge 105. In still other embodiments, I/O bridge 107 and memory bridge 105 may be integrated in a single chip. In addition, the particular components shown herein are optional. For instance, any number of add-in cards or peripheral devices might be supported. In some embodiments, switch 116 is eliminated, and network adapter 118 and add-in cards 120, 121 connect directly to I/O bridge 107.

Manipulation of 3D Objects

Figure 2:
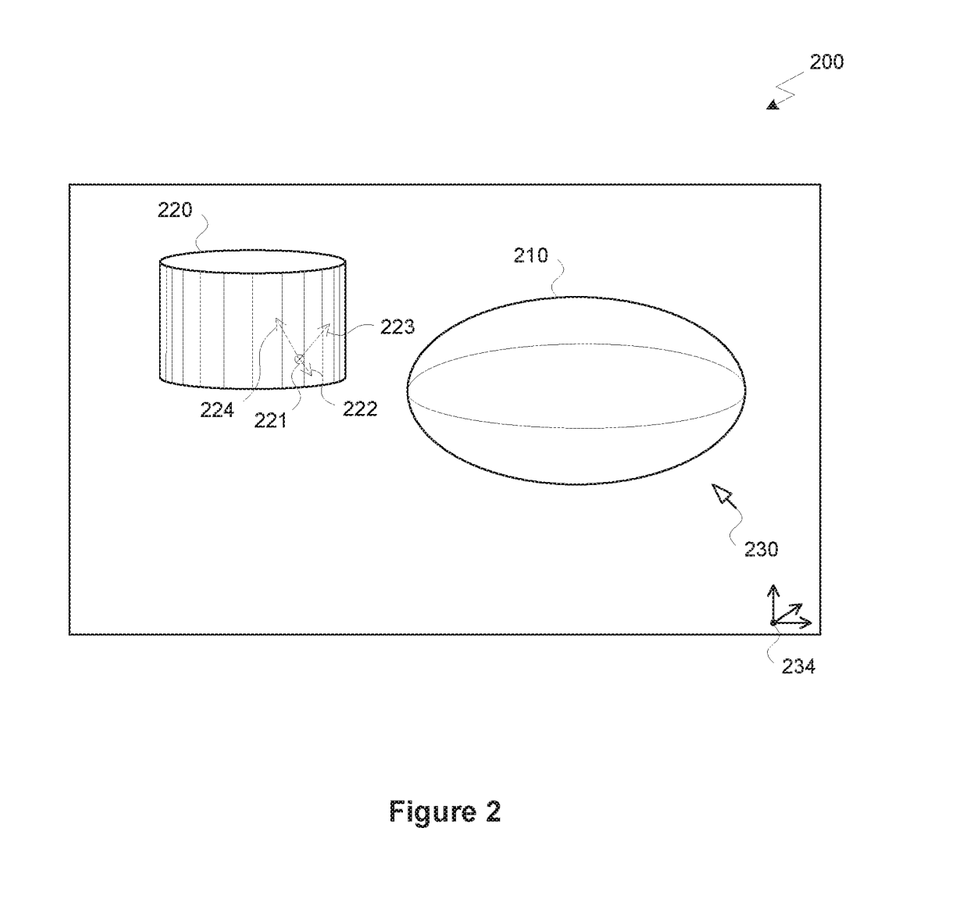
FIG. 2 illustrates a virtual environment that includes a plurality of 3D objects, according to one example embodiment of the present disclosure.

FIG. 2 illustrates a virtual environment 200 that includes a plurality of 3D objects (210, 220), according to one example embodiment of the present disclosure. The virtual environment 200 may be displayed in a graphical user interface of application 150 that reflects a two-dimensional (2D) viewing plane of model 160. The virtual environment 200 may be associated with a world coordinate system 234 that defines points along three axes for objects within the virtual environment 200.

As shown in FIG. 2, model 160 includes a first object 210 and a second object 220. Objects (e.g., 210, 220) may be specified within model 160 using various 3D primitives such as lines, triangles, quads, surfaces, parameters, and the like. For example, object 210 may be defined as an ovoid object having a center stored as x, y, and z, coordinates, an orientation stored as rotation about the x, y, and z, axes, a major diameter (e.g., along the x-axis), and one or two minor diameters (e.g., along the y-axis and z-axis, either the same or different). Various data structures for defining 3D objects are well known in the art and are within the scope of the present disclosure.

In one embodiment, an object may be defined in application 150 as having a local origin 221 and an orientation around the local origin 221 specified as a local coordinate system. The local coordinate system may be specified by three unit vectors that define three orthogonal axes, a local x-axis 222, a local y-axis 223, and a local z-axis 224. Manipulations within the virtual environment may be performed that are based on the local coordinate system.

Figure 3A:
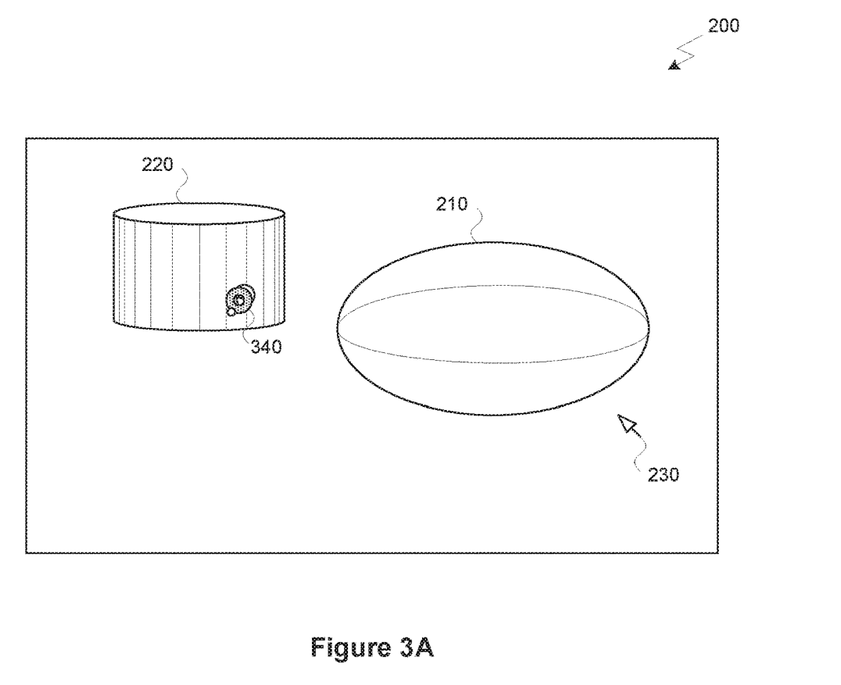
FIGS. 3A and 3B illustrate a graphical representation of a software widget for performing manipulations on objects within the virtual environment of FIG. 2, according to one example embodiment of the present disclosure.
Figure 3B:
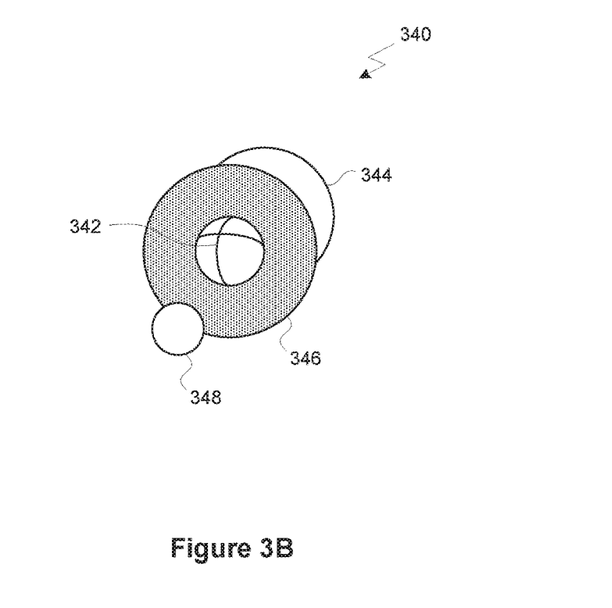

FIGS. 3A and 3B illustrate a software widget 340 for performing manipulations on objects within the virtual environment 200 of FIG. 2, according to one example embodiment of the present disclosure. As is known in the art, a "software widget" is a small portion of software that may be added to another piece of software. In FIG. 3A, the software widget 340 is a graphical user interface element that enables a user to manipulate an object 220. The software widget 340 may be invoked using a command within application 150. In one embodiment, the command may be invoked using a toolbar icon included in a toolbar of the graphical user interface for application 150. In another embodiment, the command may be invoked any time the user selects an object using mouse cursor 230. For example, by clicking on the screen at a particular pixel, an object is selected by intersecting a ray drawn through that pixel with any objects in the virtual environment 200. An intersection determination may be performed using a coarse filter that implements bounding volumes around the objects in the virtual environment 200 to select a subset of objects that may intersect with the ray, and then using a fine filter that selects an object from the subset of objects by determining which object from the subset of objects actually intersects the ray (using real surfaces of the object) and is closest to the viewing plane.

As shown in FIG. 3A, virtual environment 200 includes object 210 and object 220. A command has been invoked which initiates the software widget 340 with regard to manipulating object 220. A graphical representation of the software widget 340 is displayed within the volume of object 220 overlaid on the origin 221 of the local coordinate system. In alternate embodiments, the software widget 340 may be offset from the origin 221 such as always being displayed in a lower left corner of the screen. A close up of software widget 340 is shown in FIG. 3B. Software widget 340 is a graphical overlay including different controls used to perform various manipulation operations. A first region 342 is shown as a sphere at the center of the software widget 340. The center of the sphere coincides with the origin of the object associated with the particular instance of the software widget 340. For example, in FIG. 3A, the center of the sphere coincides with origin 221 of object 220. Software widget 340 also includes a second region 344 that is shaped like a crescent above and to the right of the first region 342, a third region 346 that is shaped like a disc that surrounds the first region 342 and borders the second region 344, and a fourth region 348 that is shaped like a circle below and to the left of the first region 342 and partially overlapping the third region 346. Each of the regions acts as a control for a different manipulation operation and responds to various types of user input.

FIGS. 4A through 4D illustrate various manipulation operations associated with the software widget 340, according to one example embodiment of the present disclosure. In one embodiment, the first region 342 (i.e., the central sphere) is associated with a constrained surface positioning operation. When a user clicks on the software widget 340 while mouse cursor 230 is positioned within the first region 342, the user is free to move the object associated with the software widget 340 within the virtual environment 400a. Typically, the positioning operation relies on a click-and-drag mouse operation, where the user depresses the mouse 109 button at a first location in the viewing plane that is over the first region 342, drags the mouse cursor 230 to a second location in the viewing plane, and releases the mouse 109 button to complete the positioning operation. It will be appreciated, however, that the positioning operation may rely on other types of input techniques, such as clicking a first time to activate the positioning operation and clicking a second time to terminate the positioning operation. Alternately, the input device may not be a mouse at all and the user may interact with the software widget using other input devices such as a stylus or multi-touch input.

Figure 4A:
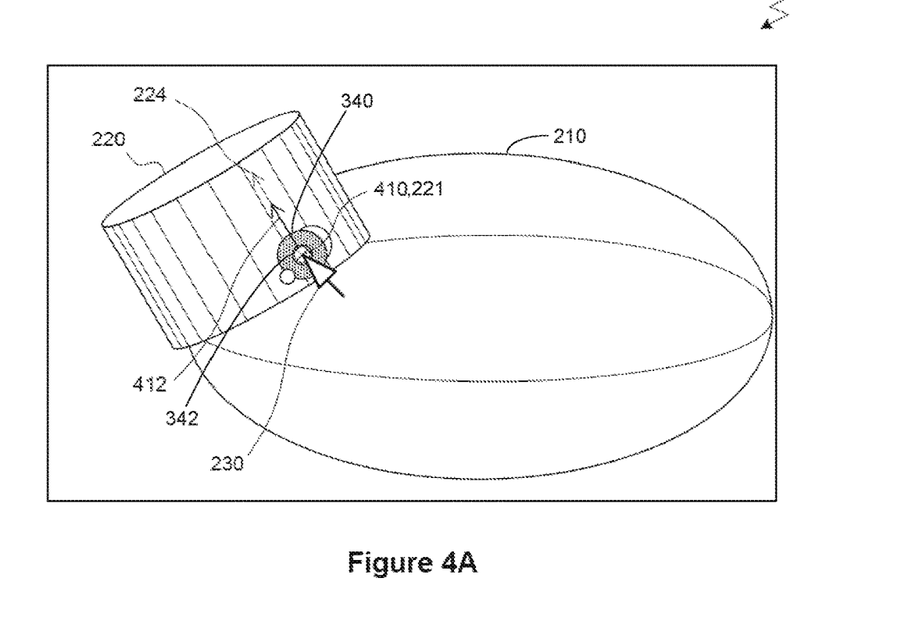
FIGS. 4A through 4D illustrate various manipulation operations associated with the software widget, according to one example embodiment of the present disclosure.

As shown in FIG. 4A, a user moves mouse cursor 230 to a second location in virtual environment 400a. Application 150 determines a point 410 on a surface of object 210 that corresponds to the intersection of a ray through the second location that intersects with any surface of object 210. Any technically feasible technique for determining the point on the surface of an object based on the intersection of a ray may be implemented by application 150. For example, such techniques may involve determining whether any points on the ray are included in a surface by solving a mathematical formula. Application 150 may also determine a normal vector 412 corresponding to the point 410 on the surface of object 210. The positioning operation is completed by moving object 220 to the new location such that origin 221 corresponds to point 410 and z-axis 224 is co-axial with normal vector 412. The difference between the new orientation of object 220 and the old orientation of object 220 (with respect to the x-axis and y-axis) is minimized. In one embodiment, the difference is minimized by performing a transform operation on the old orientation around a rotation axis that originates at point 410 and is normal to a plane that is defined by the old z-axis and the normal vector 412. In another embodiment, the new orientation of object 220 is selected such that either the x-axis or y-axis is aligned to a default plane in the world coordinate system 234.

Figure 4B:
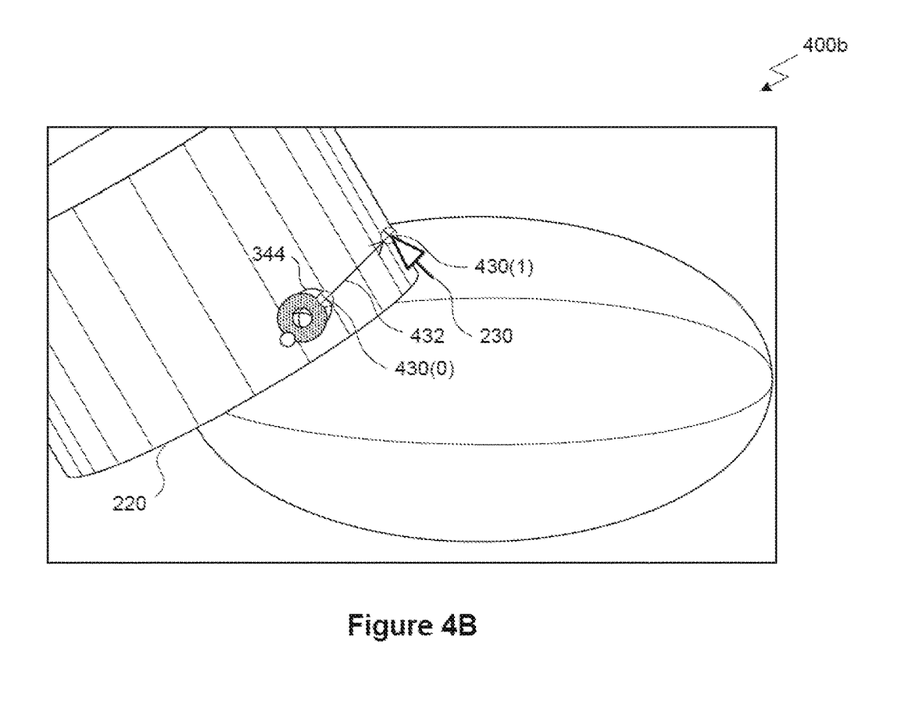

In one embodiment, the second region 344 (i.e., the crescent shape) of software widget 340 is associated with a scaling operation. When a user clicks on the software widget 340 while mouse cursor 230 is positioned within the second region 344, the user is free to scale the size of the object 220 associated with the software widget 340 within the virtual environment 400b. Typically, the scaling operation also relies on a click-and-drag mouse operation, however, other input techniques may be used as well, such as those techniques described above in conjunction with the constrained surface positioning operation. As shown in FIG. 4B, a user moves mouse cursor 230 to a first location 430(0) in virtual environment 400b that intersects with the second region 344 of software widget 340. As the user clicks-and-drags the mouse cursor 230 to a second location 430(1) in virtual environment 400b, application 150 determines the direction and magnitude of a vector 432 from the first location 430(0) to the second location 430(1). The vector may be a 2 coordinate vector in screen space (i.e., pixel coordinates). In one embodiment, application 150 divides the screen space into two halves, each half associated with either an increasing scaling operation or a decreasing scaling operation. For example, by dividing the screen space along a vertical line that passes through the first location 430(0), the x component of the vector 432 will determine whether the object 220 is increased in size or decreased in size. Object 220 is scaled around the origin 221 of the object 220 by a scale factor determined based on the magnitude of vector 432. For example, the magnitude of vector 432 may be divided by a normalization factor to determine the scale factor. Then, the size of object 220 may be scaled based on the determined scale factor.

Figure 4C:
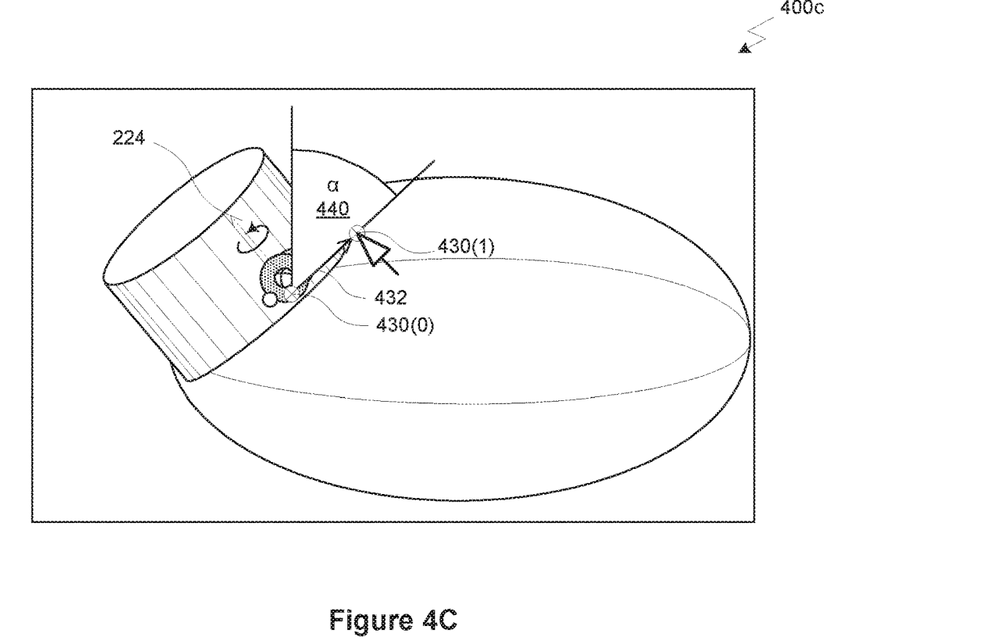

In one embodiment, the third region 346 (i.e., the disc shape) of software widget 340 is associated with a rotation operation. When a user clicks on the software widget 340 while mouse cursor 230 is positioned within the third region 346, the user is free to rotate the object associated with the software widget 340 within the virtual environment 400c. Again, the rotation operation relies on a click-and-drag mouse operation, but other input techniques may be used as well. As shown in FIG. 4C, a user moves mouse cursor 230 to a first location 430(0) in virtual environment 400c that intersects with the third region 346 of software widget 340. As the user clicks-and-drags the mouse cursor 230 to a second location 430(1) in virtual environment 400c, application 150 determines the direction and magnitude of a vector 432 from the first location 430(0) to the second location 430(1). In one embodiment, application 150 determines an angle parameter (a) 440 based on the direction of vector 432. For example, application 150 may perform an arctangent calculation based on the ratio of the y-component of vector 432 with the x-component of vector 432. Object 220 is rotated around the z-axis 224 of object 220 based on the angle parameter 444.

Figure 4D:
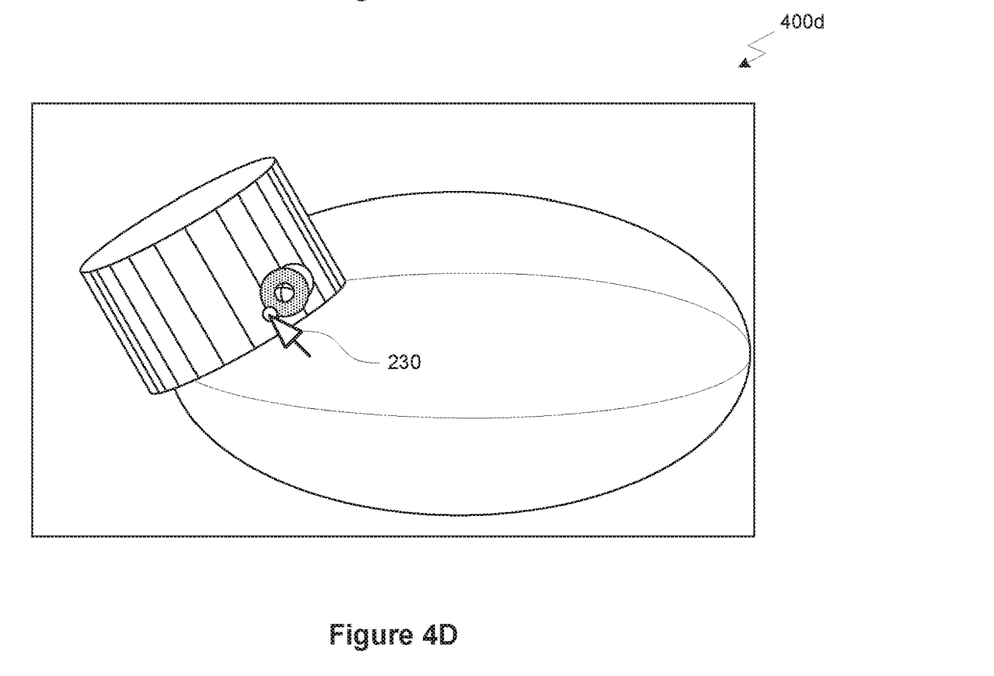

In one embodiment, the fourth region 348 (i.e., the circular shape) is associated with a mode operation. When a user clicks on the software widget 340 while mouse cursor 230 is positioned within the fourth region 348, the software widget 340 transitions to a second mode, described below in conjunction with the description for FIGS. 5A and 5B. In the second mode, the graphical representation of software widget 340 is adjusted to show different controls that are associated with different manipulation operations.

Figure 5A:
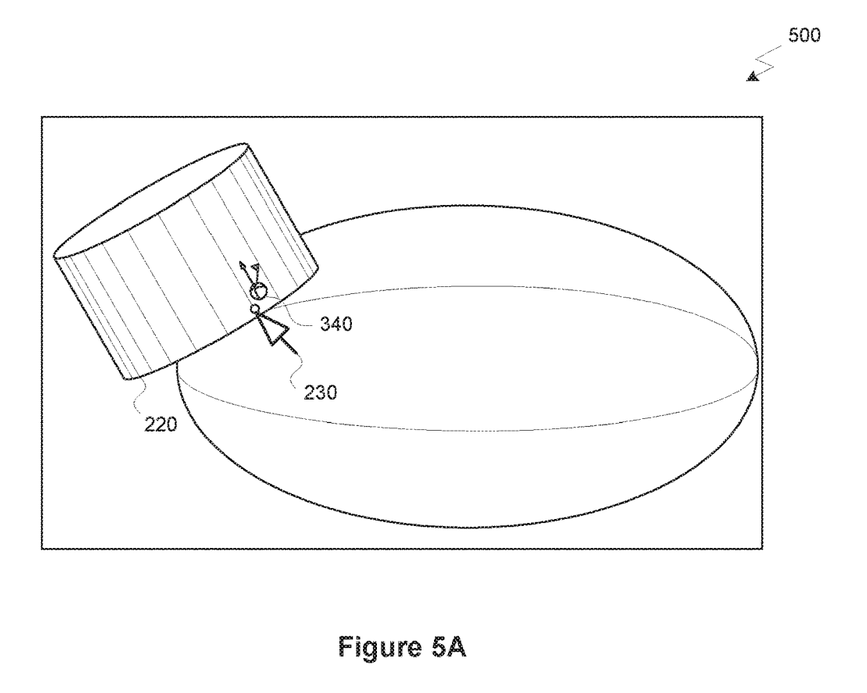
FIGS. 5A through 5B illustrate the graphical representation of the software widget in a second mode, according to one example embodiment of the present disclosure.
Figure 5B:
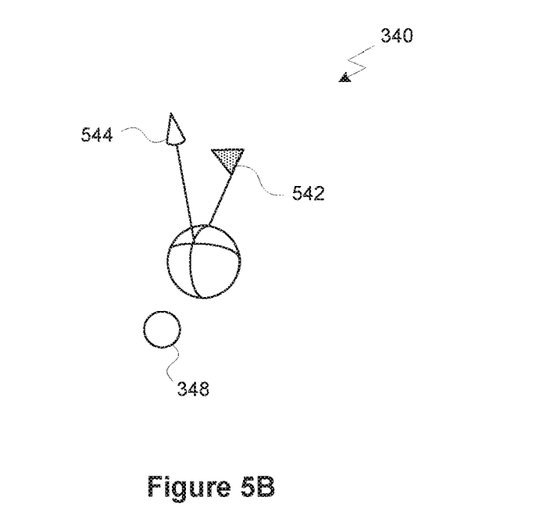

FIGS. 5A through 5B illustrate the graphical representation of the software widget 340 in the second mode, according to one example embodiment of the present disclosure. As shown in FIG. 5A, when the user clicks at a location that intersects with the fourth region 348 of software widget 340, the graphical representation of software widget 340 changes to display different controls. In one embodiment, the second 342 and third regions 346 of software widget 340 are hidden, and a first flag control 542 and a second flag control 544 of software widget 340 are displayed, as shown in FIG. 5B. The fourth region 348 (i.e., the mode control) of software widget 340 remains visible to toggle back and forth between the first mode and the second mode. In other embodiments, software widget 340 may have three or more modes that may be toggled through sequentially using the fourth region 348 of software widget 340.

Figure 6A:
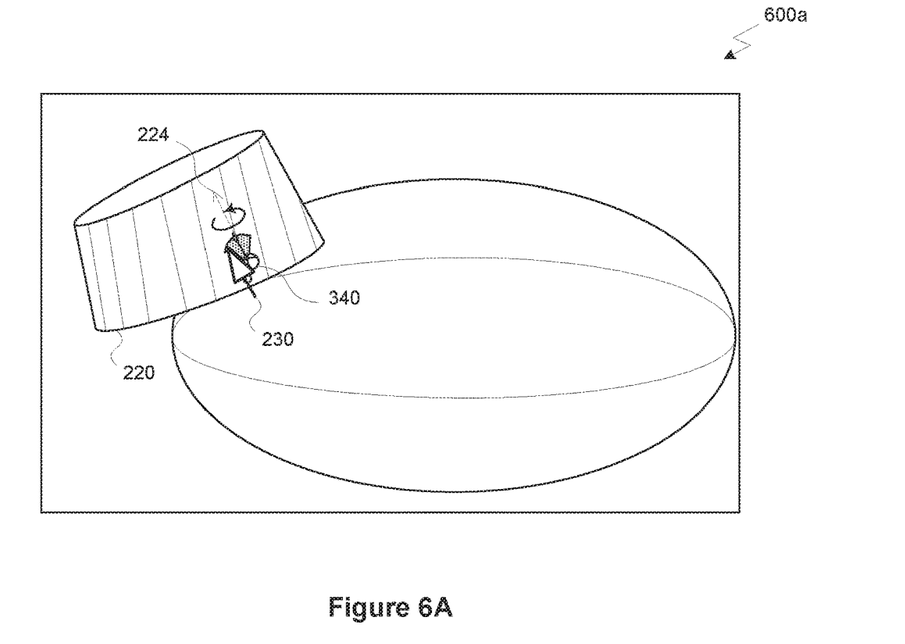
FIGS. 6A through 6D illustrate additional manipulation operations associated with the second mode of software widget, according to one example embodiment of the present disclosure.
Figure 6B:
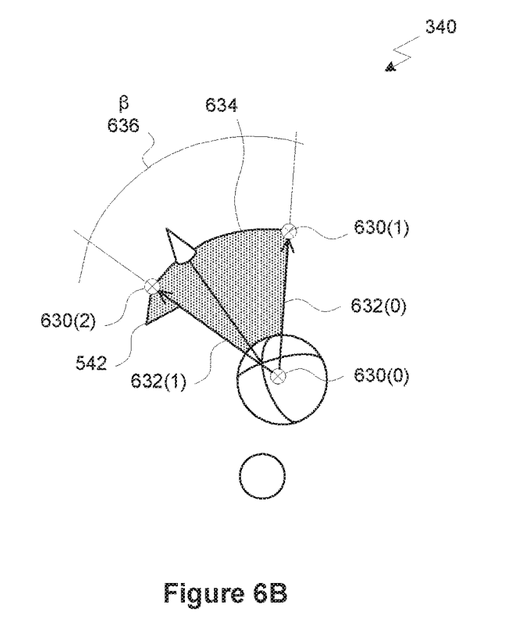

FIGS. 6A through 6D illustrate additional manipulation operations associated with the second mode of software widget 340, according to one example embodiment of the present disclosure. As shown in FIG. 6A, a user may select the first flag control 542 of software widget 340 and drag the flag around the center of the software widget 340. The position of the first flag control 542 defines an angle parameter that may be used as an input to some type of manipulation operation. In one embodiment, the first flag control 542 (i.e., the triangle shape) is associated with a twist operation. When a user clicks on the software widget 340 while mouse cursor 230 is positioned over the first flag control 542, the user is free to drag the flag around the center of the software widget 340 to define the angle parameter associated with the twist operation. As shown in FIG. 6B, when the user selects the first flag control 542 at an initial position 630(1), the first flag control 542 is associated with a default vector 632(0) defined from the center 630(0) of software widget 340 to the initial position 630(1). As the user drags the first flag control 542 around the center 630(0), the position of the first flag control 542 specifies a new vector 632(1) defined from the center 630(0) to a second position 630(2). The angle ($\beta$) 636 between the two vectors (i.e., 632(0) and 632(1)) may be calculated to determine the angle parameter associated with the twist operation. The graphical representation of the software widget 340 may be changed dynamically as the first flag control 542 is dragged around the center 630(0). For example, as shown in FIG. 6B, a sector of a disc between the initial vector 632(0) and the new vector 632(1) may be shaded to reflect the adjustment to the twist parameter.

Returning back now to FIG. 6A, the twist operation modifies the object 220 in a direction along the z-axis 224. The geometry of the object 220 is rotated around the z-axis 224 as a function of the z-coordinate of the geometry. For example, points on object 220 at a z-coordinate of 0 will remain at their initial location, points on object 220 at a z-coordinate of 1 will rotate around the z-axis 224 by 2 degrees, points on object 220 at a z-coordinate of 2 will rotate around the z-axis 224 by 4 degrees, and so on (where the twist parameter corresponds to 2 degrees of rotation per unit of travel in the z direction). The effect, as illustrated in FIG. 6A, is that the object appears to twist in the z direction, where the magnitude of the effect is related to the twist parameter controlled by the first flag control 542.

Figure 6C:
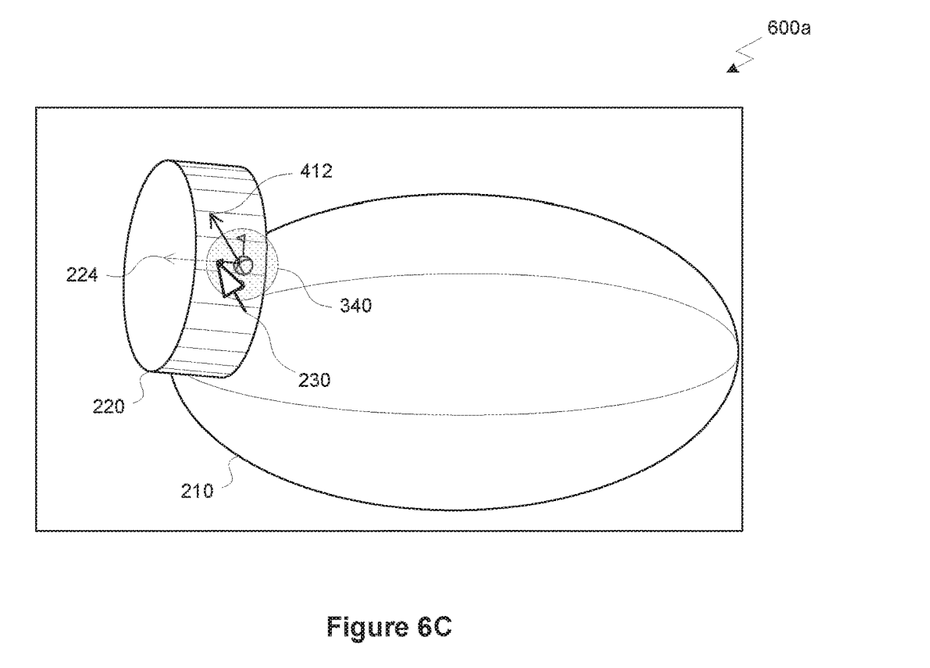

As shown in FIG. 6C, a user may select the second flag control 544 of software widget 340 and drag the flag around the center of the software widget 340. The position of the second flag control 542 defines an orientation parameter that may be used as an input to some type of manipulation operation for objects within virtual environment 600c. In one embodiment, the second flag control 544 (i.e., the cone shape) is associated with an orientation operation. The orientation operation allows a user to specify a new local orientation for an object (i.e., to "point" the object in a new direction). As described above, the surface constrained positioning operation allows a user to move an object to a point on a surface of a different object, the scaling operation allows the user to change the size of the object, the rotation operation allows the object to be rotated around a z-axis, and the twist operation deforms the object as a function of the shape of the object with respect to position along the local z-axis 224. However, all of the operations described above constrain the local z-axis 224 of the object to a normal vector associated with the position on the surface the object is constrained to. In contrast, the orientation operation allows a user to skew the local z-axis 224 away from the normal vector 412 by re-orienting object 220 with respect to object 210.

Figure 6D:
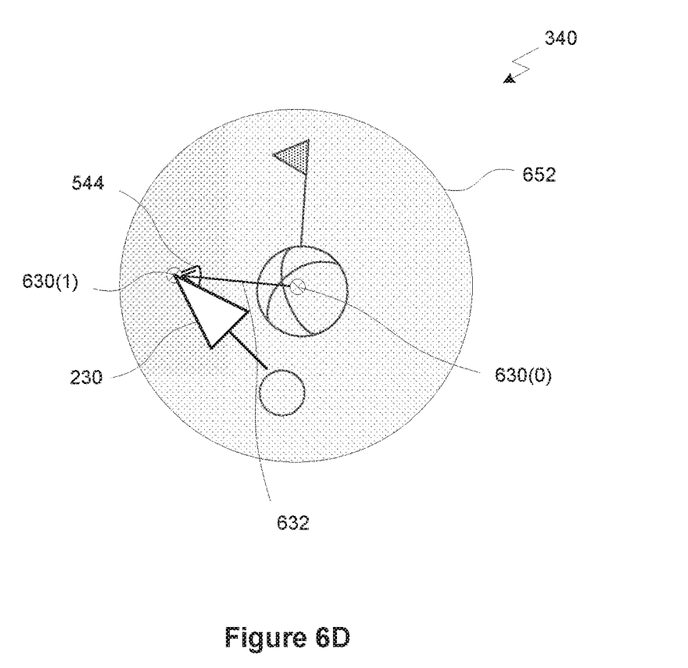

As shown in FIG. 6D, when a user clicks on the second flag control 544, a sphere 652 is superimposed over software widget 340. The sphere 652 is used to determine a new orientation vector 632 defined between the center 630(0) of software widget 340 and a point 630(1) on the sphere 652. In one embodiment, prior to selecting the second flag control 544 in order to initiate the orientation operation, the second flag control 544 is displayed as part of software widget 340 in an orientation that matches the current orientation of the z-axis 224 of object 220 in virtual environment 600a. When the user selects the second flag control 544, the sphere 652 is superimposed over software widget 340 and enables the user to choose a new orientation vector 632 by intersecting a ray based on the location of mouse cursor 230 with the sphere 652. Again, a ray is generated from an eye position through the pixel in the viewing plane corresponding to the mouse cursor 230 and intersected with sphere 652. Sphere 652 is a 3D object consisting of all points an equal distance from the center 630(0) of software widget 340. As long as the mouse cursor 230 is positioned over the sphere 652, the ray will intersect the sphere 652 at two locations (both entering the sphere 652 and exiting the sphere 652). Application 150 may determine the two locations based on an equation associated with the sphere (i.e., given the center 630(0) and a radius of the sphere) and an equation associated with the ray (given a starting location and direction). By setting these two equations to be equal and solving for all points that are a part of the ray and a part of the sphere 652, application 150 can determine the coordinates for the point 630(1) on the sphere 652 corresponding to the particular location of mouse cursor 230. The new vector 632 determines a new orientation of the z-axis of object 220 where the z-axis is offset from the normal vector associated with the surface constraint position. In effect, the user may use software widget 340 to "point" the object in a new direction.

Figure 7:
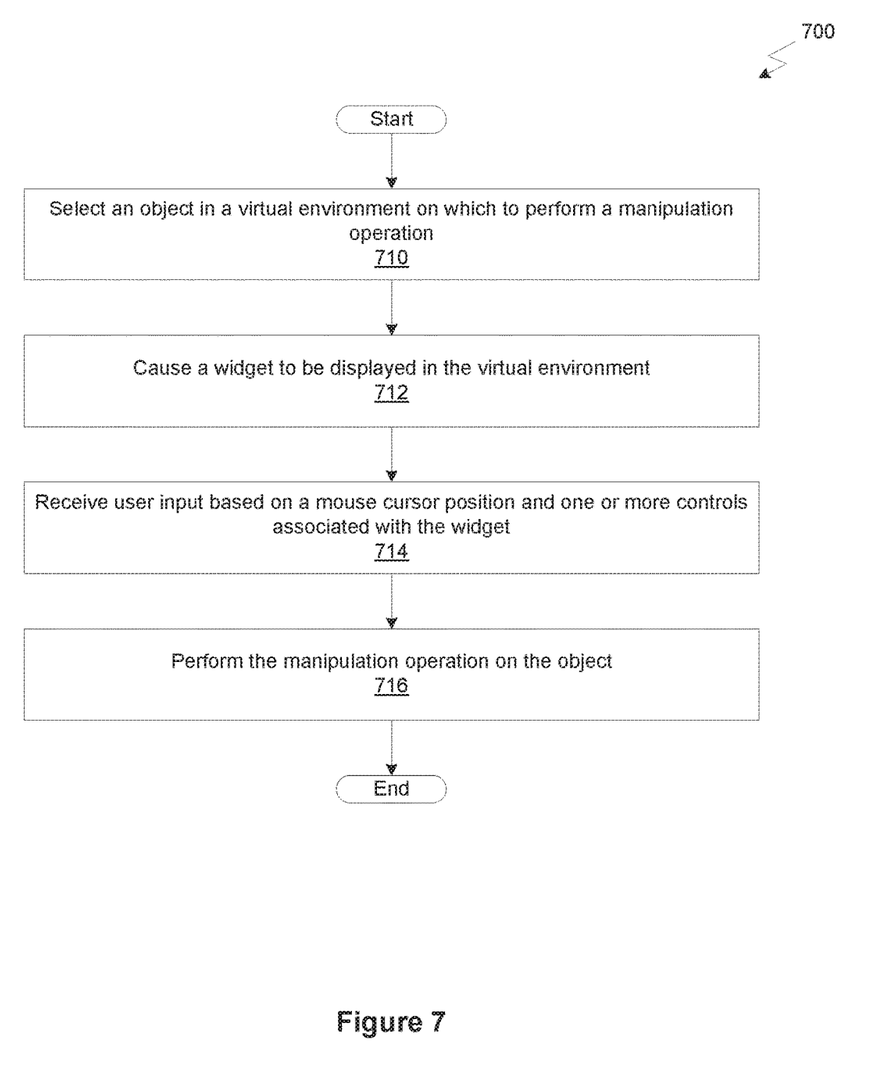
FIG. 7 is a flowchart of method steps for manipulating a 3D object in a virtual environment using a software widget, according to one example embodiment of the present disclosure.

FIG. 7 is a flowchart of method steps 700 for manipulating a 3D object in a virtual environment 200 using a software widget 340, according to one example embodiment of the present disclosure. Although the method steps are described in conjunction with the systems of FIGS. 1-6, persons skilled in the art will understand that any system configured to perform the method steps, in any order, is within the scope of the disclosure.

The method 700 begins at step 710, where application 150 selects an object 220 in a virtual environment 200 on which to perform a manipulation operation. In one embodiment, a user uses a mouse 109 to position the mouse cursor 230 over an object 220 in the virtual environment and selects the object 220. The user may then initiate a command using a toolbar to manipulate the object 220. Application 150 selects the object directly underneath the mouse cursor 230 in the virtual environment. In other embodiments, application 150 may select an object using other means, such as different input devices or based on an object hierarchy within the virtual environment 200 (such as by selecting the most recently modified object or the last object added to the virtual environment). At step 712, application 150 causes a graphical representation of a software widget 340 to be displayed in the virtual environment 200. In one embodiment, the software widget 340 is displayed at a position that corresponds with a local origin 221 of the object 220.

At step 714, application 150 receives user input based on the location of a mouse cursor 230 and one or more controls associated with the software widget 340. Application 150 determines whether the location of the mouse cursor 230 is associated with one or more controls of the software widget 340. If the location of the mouse cursor 230 is associated with a first region 342 of the software widget 340, then application 150 performs a surface constrained position operation based on the user input. If the location of the mouse cursor 230 is associated with a second region 344 of the software widget 340, then application 150 performs a scaling operation. If the location of the mouse cursor 230 is associated with a third region 346 of the software widget 340, then application 150 performs a rotate operation. If the location of the mouse cursor 230 is associated with a fourth region 348 of the software widget 340, then application 150 toggles the mode of software widget 340 to display other controls related to other manipulation operations. In the second mode, if the location of the mouse cursor 230 is associated with a first flag control 542 of the software widget 340, then application 150 performs a twist operation. In the second mode, if the location of the mouse cursor 230 is associated with a second flag control 544 of the software widget 340, then application 150 performs an orientation operation. At step 716, application 150 performs the manipulation operation specified based on the user input and method 700 terminates.

In sum, the present application describes a system and method for manipulating 3D objects using a software widget. The software widget enables a user to perform a plurality of different operations using intuitive controls displayed substantially simultaneously in a location associated with the object. The software widget is an improvement on prior art manipulation techniques which required a user to perform many complex commands in order to effectuate the operations.

While the foregoing is directed to certain example embodiments, other and further embodiments may be devised without departing from the basic scope thereof. For example, aspects of the embodiments may be implemented in hardware or software or in a combination of hardware and software. One embodiment may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the aforementioned functions, are included as example embodiments.

In view of the foregoing, the scope of the present disclosure is determined by the claims that follow.

What is claimed is:

1. A method for manipulating a three-dimensional (3D) object, the method comprising:
   receiving user input associated with at least one control included in a plurality of controls that are used to manipulate the 3D object, wherein the plurality of controls includes an orientation control that, when adjusted, causes a new orientation vector to be determined that is implemented to change the orientation of the 3D object, wherein, prior to being adjusted, the orientation control has an orientation that matches an orientation of an axis of the 3D object;
   determining a manipulation operation corresponding to the at least one control; and
   executing the manipulation operation to adjust the 3D object.

2. The method of claim 1, wherein the plurality of controls further includes a twist control that, when adjusted, causes a new angle parameter to be determined that is implemented to deform the 3D object along an axis.

3. The method of claim 1, wherein the plurality of controls further includes a rotation control that, when adjusted, causes a new angle parameter to be determined that is implemented to rotate the 3D object around an axis.

4. The method of claim 1, wherein the plurality of controls further includes a scaling control that, when adjusted, causes a scale factor to be determined that is implemented to scale the 3D object.

5. The method of claim 1, wherein plurality of controls further includes a positioning control that, when adjusted, causes an intersection point to be determined that is implemented to translate the 3D object to a new position such that an origin associated with the 3D object corresponds to the intersection point.

6. The method of claim 1, wherein the plurality of controls further includes a mode control that, when adjusted, toggles between two or more modes of a software widget, wherein each mode is associated with a different graphical representation displayed in a graphical user interface.

7. The method of claim 1, wherein the plurality of controls further includes a twist control, a rotation control, a scaling control, a positioning control, and a mode control.

8. One or more non-transitory computer-readable media storing instructions that, when executed by one or more processors, cause the one or more processors to display a software widget within a graphical user interface, the software widget including a plurality of controls that are used to manipulate a three-dimensional (3D) object, and to perform the steps of:
receiving user input associated with at least one control included in the plurality of controls, wherein the plurality of controls includes an orientation control that, when adjusted, causes a new orientation vector to be determined that is implemented to change the orientation of the 3D object, wherein, prior to being adjusted, the orientation control has an orientation that matches an orientation of an axis of the 3D object;
determining a manipulation operation corresponding to the at least one control; and
executing the manipulation operation to adjust the 3D object.

9. The one or more non-transitory computer-readable media of claim 8, wherein the plurality of controls further includes a twist control that, when adjusted, causes a new angle parameter to be determined that is implemented to deform the 3D object along an axis.

10. The one or more non-transitory computer-readable media of claim 8, wherein the plurality of controls further includes a rotation control that, when adjusted, causes a new angle parameter to be determined that is implemented to rotate the 3D object around an axis.

11. The one or more non-transitory computer-readable media of claim 8, wherein the plurality of controls further includes a scaling control that, when adjusted, causes a scale factor to be determined that is implemented to scale the 3D object.

12. The one or more non-transitory computer-readable media of claim 8, wherein plurality of controls further includes a positioning control that, when adjusted, causes an intersection point to be determined that is implemented to translate the 3D object to a new position such that an origin associated with the 3D object corresponds to the intersection point.

13. The one or more non-transitory computer-readable media of claim 8, wherein the plurality of controls further includes a mode control that, when adjusted, toggles between two or more modes of a software widget, wherein each mode is associated with a different graphical representation displayed in a graphical user interface.

14. The one or more non-transitory computer-readable media of claim 8, wherein the plurality of controls further includes a twist control, a rotation control, a scaling control, a positioning control, and a mode control.

15. A system for manipulating a three-dimensional (3D) object, the system comprising:
a processor; and
a memory coupled to the processor, wherein the memory includes an application that, when executed by the processor, causes the processor to:
receive user input associated with at least one control included in a plurality of controls, wherein the plurality of controls includes an orientation control that, when adjusted, causes a new orientation vector to be determined that is implemented to change the orientation of the 3D object, wherein, prior to being adjusted, the orientation control has an orientation that matches an orientation of an axis of the 3D object;
determine a manipulation operation corresponding to the at least one control; and
execute the manipulation operation to adjust the 3D object.

16. The system of claim 15, wherein the plurality of controls further includes a twist control that, when adjusted, causes a new angle parameter to be determined that is implemented to deform the 3D object along an axis.

17. The system of claim 15, wherein the plurality of controls further includes a rotation control that, when adjusted, causes a new angle parameter to be determined that is implemented to rotate the 3D object around an axis.

18. The system of claim 15, wherein the plurality of controls further includes a scaling control that, when adjusted, causes a scale factor to be determined that is implemented to scale the 3D object.

19. The system of claim 15, wherein plurality of controls further includes a positioning control that, when adjusted, causes an intersection point to be determined that is implemented to translate the 3D object to a new position such that an origin associated with the 3D object corresponds to the intersection point.

20. The system of claim 15, wherein the plurality of controls further includes a mode control that, when adjusted, toggles between two or more modes of a software widget, wherein each mode is associated with a different graphical representation displayed in a graphical user interface.

21. The system of claim 15, wherein the plurality of controls further includes a twist control, a rotation control, a scaling control, a positioning control, and a mode control.

22. A method for manipulating a three-dimensional (3D) object, the method comprising:
receiving user input associated with at least one control included in a plurality of controls that are used to manipulate the 3D object, wherein the plurality of controls includes an orientation control that, when adjusted, causes a new orientation vector to be determined that is implemented to change the orientation of the 3D object, and a twist control that, when adjusted, causes a new angle parameter to be determined that is implemented to deform the 3D object along an axis;

determining a manipulation operation corresponding to the at least one control; and executing the manipulation operation to adjust the 3D object.

23. The method of claim 22, wherein the new angle parameter is implemented to deform the 3D object based on a position along the axis and the new angle parameter.

* * * * *